O. Collier,
Steam-Engine-Piston Packing,
N° 83,123. Patented Oct. 13, 1868.
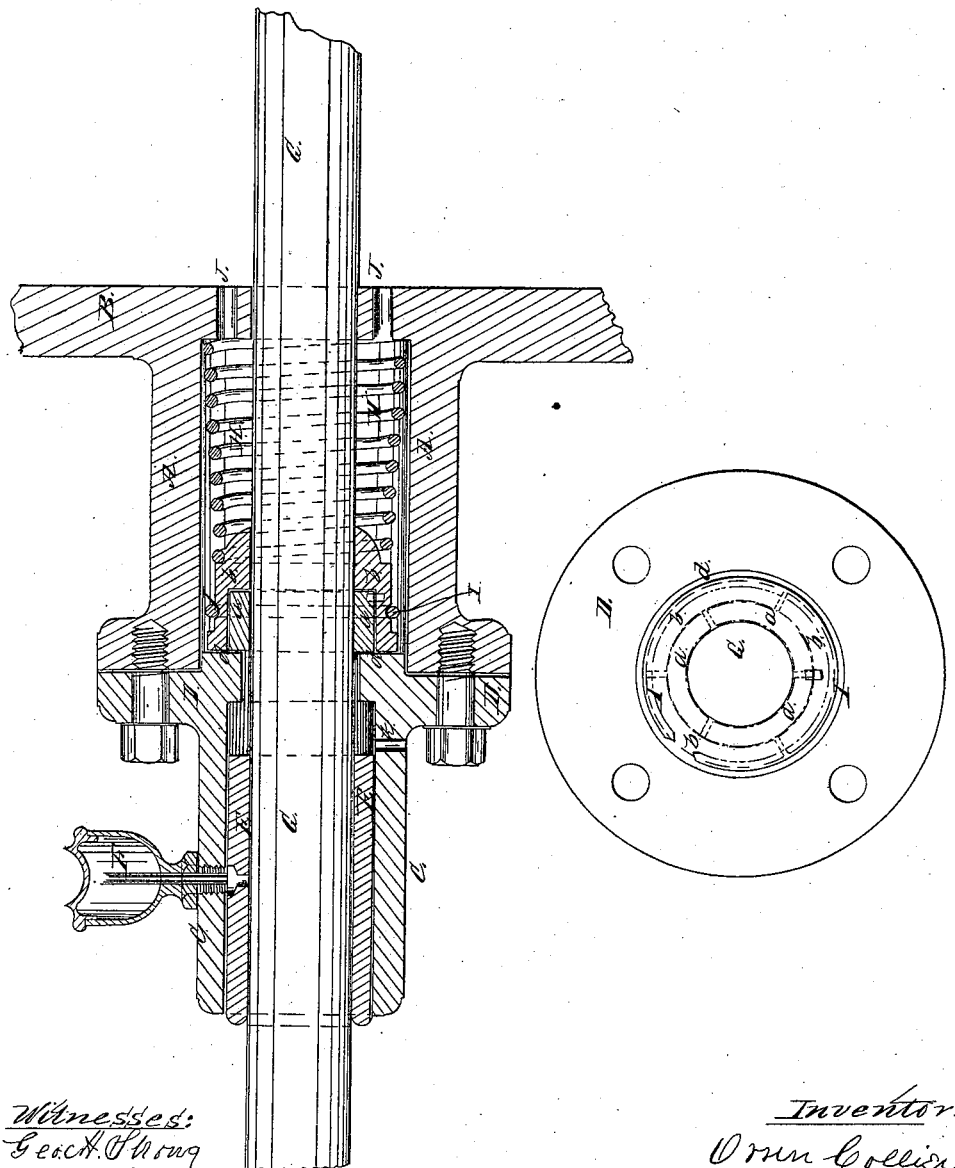
Witnesses:
Geo. H. Strong
Jno. L. Boone
Inventor:
Owen Collier
By his atty, D Ewey &c.

UNITED STATES PATENT OFFICE.

ORRIN COLLIER, OF SACRAMENTO, CALIFORNIA ASSIGNOR TO HIMSELF AND ERVA B. SILLIMAN, OF SAME PLACE.

IMPROVEMENT IN PISTON-ROD PACKING.

Specification forming part of Letters Patent No. 83,123, dated October 13, 1868.

*To all whom it may concern:*

Be it known that I, ORRIN COLLIER, of the city and county of Sacramento, State of California, have invented an Improved Metallic Pressure-Packing for Shafts and Piston-Rods; and I do hereby declare the following description and accompanying drawings are sufficient to enable any person skilled in the art or science to which it most nearly appertains to make and use my said invention or improvement without further invention or experiment.

My invention relates to the packing used to render piston-rods or propeller-shafts steam and water tight, and has for its object the construction of a metallic packing which shall be operated upon by the gas, vapor, or liquid exerting the pressure, in such a manner as to form a perfectly tight joint, and at the same time yield to the movements of the rod, in case it should not work quite true, so as not to cut or bind, while the different parts of the packing shall wear equally, and thus preserve their adjustment. It also consists in so forming the gland of the stuffing-box that it serves as a support and guide for the rod or shaft, and affords great facility for lubrication.

The stuffing-box is formed in the ordinary manner, with the exception that, instead of entering the cage, the body of the gland projects outward and forms a support for the rod, and at the same time serves as an attachment for an oil-cup, which can be easily kept full.

Within the cage are three or more cylindrical segments fitting around the shaft or piston, and having another series surrounding them and breaking joints with them, the whole being kept in position by an elastic ring or band. The segments are faced to fit the inner end of the gland perfectly tight, and are kept in close contact by a spiral spring within the cage. Two small openings connect the interior of the cage with the source of pressure, as the cylinders in an engine or pump, so that the greater the pressure the closer the rings are forced against the rod and inner face of the gland.

To more fully explain my invention, reference is had to the drawings accompanying this specification, and the letters of reference marked thereon, of which—

Figure 1 is a side sectional elevation of a stuffing-box of my construction. Fig. 2 is an end sectional view.

Similar letters indicate corresponding parts.

A is the cage of a stuffing-box, which may be connected or cast with a cylinder-head, as at B. The body of the gland C, instead of entering the cage, projects outward, and is firmly bolted to the cage by means of the flange D. The interior of the gland may be Babbitted, or have a bushing of any soft metal, as at E, which supports the piston-rod G, and is lubricated from the oil-cup F. Within the cage, and fitting closely around the rod G, is a ring or short cylinder, which is cut into three or more segments, *a a a*. Surrounding this is another segmental ring or cylinder, *b b b*, which also fits closely, and is made to break joints with the first, as in the metallic packing for pistons. These two rings are faced so as to fit perfectly steam-tight against the gland at *d*, and are also kept in place by the spiral spring H within the cage. An elastic band or ring, I, surrounds the two packing-rings, and retains them in place when they are not acted on by the pressure of steam. A free space is left between the sides of the cage or stuffing-box and the spring and rings, in order to permit the latter to yield freely to the movements of the rod in case it should get out of line or not work quite true; and the rings *a* and *b* are so constructed that both shall have about the same extent of surface wearing against the rod, and both about the same extent of surface against the face of the gland, in order that the two rings may wear equally in either direction, and thus preserve their adjustment to the other parts and to each other.

Two small holes, J J, are made through the cylinder-head, thus connecting the interior of the cylinder with the interior of the cage, and allowing the pressure of the steam to act on the rings *a* and *b*, and keep them in close contact with the rod and the gland *d*, forming at all times a perfectly steam-tight packing. A small hole, K, is made in the lower part of the gland to allow the escape of any condensed moisture that may gather there.

In case the packing were applied to a water or air pump, the pressure would come from the liquid or the fluid, as the case might be. One of the most important uses of my packing is in the stuffing-boxes of propeller-shafts, in which case the openings J J would connect with the outside water, and the pressure on the rings would depend upon the depth to which the shaft was submerged.

My device is simple, and not easily got out of repair, is perfectly efficacious and self-regulating, and, in the case of shafts especially, will do away with the great expense of repairing the derangements of the stuffing-box which now so frequently occur.

I am aware of the following applications, to wit: the rejected application of C. F. Jauriet, filed September 19, 1865; of Wm. H. Shock, withdrawn October 12, 1850; of J. A. Richardson, September 11, 1851, withdrawn; and of Merriam & Darling, withdrawn January 26, 1853, and in the patents of C. F. Jauriet, February 13, 1866, and Francis Wright, July 24, 1866. These I do not claim; but What I do claim, and desire to secure by Letters Patent, is—

1. The metal rings $a$ and $b$, as constructed so that they both have about the same amount of surface-bearing against the rod, and both about the same amount of surface-bearing against the face of the gland, whereby the two shall wear equally, substantially as described.

2. The construction of the packing with reference to the stuffing-box, whereby a free space is left around the rings, so as to allow them to move freely with the rod if it should not work perfectly true.

3. The gland C and the lining E, with the oil-cup F, when arranged substantially as and for the purposes herein described.

In witness whereof I have hereunto set my hand and seal.

ORRIN COLLIER. [L. S.]

Witnesses:
C. W. N. SMITH,
JNO. L. BOONE.